United States Patent
Osetek et al.

(10) Patent No.: US 11,390,115 B2
(45) Date of Patent: Jul. 19, 2022

(54) WHEEL RIM AND HUB ASSEMBLY GASKET AND GASKET KITS

(71) Applicants: Daniel J Osetek, Center Conway, NH (US); Brian J Chalmers, Ashland, NH (US); William R Prushinski, Intervale, NH (US)

(72) Inventors: Daniel J Osetek, Center Conway, NH (US); Brian J Chalmers, Ashland, NH (US); William R Prushinski, Intervale, NH (US)

( * ) Notice: Subject to any disclaimer, the term of this patent is extended or adjusted under 35 U.S.C. 154(b) by 593 days.

(21) Appl. No.: 16/435,812

(22) Filed: Jun. 10, 2019

(65) Prior Publication Data
US 2020/0384803 A1 Dec. 10, 2020

(51) Int. Cl.
*B60B 27/00* (2006.01)
*F16J 15/06* (2006.01)
*B60B 3/16* (2006.01)
*B60B 27/06* (2006.01)
*F16J 15/10* (2006.01)

(52) U.S. Cl.
CPC ............ *B60B 27/0073* (2013.01); *B60B 3/16* (2013.01); *B60B 27/065* (2013.01); *F16J 15/064* (2013.01); *F16J 15/102* (2013.01); *B60B 2360/94* (2013.01); *B60B 2900/211* (2013.01); *B60B 2900/5114* (2013.01); *B60B 2900/541* (2013.01)

(58) Field of Classification Search
CPC ..... B60B 3/16; B60B 27/0073; B60B 27/065; B60B 2360/94; B60B 2900/211; B60B 2900/5114; B60B 2900/541; F16J 15/06; F16J 15/061; F16J 15/064; F16J 15/10; F16J 15/102
See application file for complete search history.

(56) References Cited

U.S. PATENT DOCUMENTS

| | | | |
|---|---|---|---|
| 5,190,355 A * | 3/1993 | Hobbie | F16C 33/723 384/477 |
| 5,560,619 A * | 10/1996 | Acree | F16J 15/064 301/105.1 |
| 5,975,647 A | 11/1999 | Pons et al. | |
| 6,092,813 A * | 7/2000 | Merkler | B60B 17/00 277/644 |
| 6,971,722 B2 * | 12/2005 | Denton | B60B 7/14 301/108.4 |
| 7,824,107 B2 | 11/2010 | Takahashi et al. | |
| 8,256,968 B2 | 9/2012 | Kapaan et al. | |
| 9,321,308 B2 | 4/2016 | Baratti et al. | |

FOREIGN PATENT DOCUMENTS

EP 0800011 B1 * 11/2002

* cited by examiner

*Primary Examiner* — Gilbert Y Lee
(74) *Attorney, Agent, or Firm* — Catherine Napjus; Michael Persson; Chisholm, Persson & Ball, PC

(57) ABSTRACT

A noncorrosive, water-impermeable gasket is used between a wheel rim and a hub assembly so that they do not corrode together making their separation difficult or impossible. The gasket includes a gasket flange with a gasket bolt pattern that is alignable with a hub bolt pattern of the hub assembly and a rim bolt pattern of the wheel rim.

12 Claims, 4 Drawing Sheets

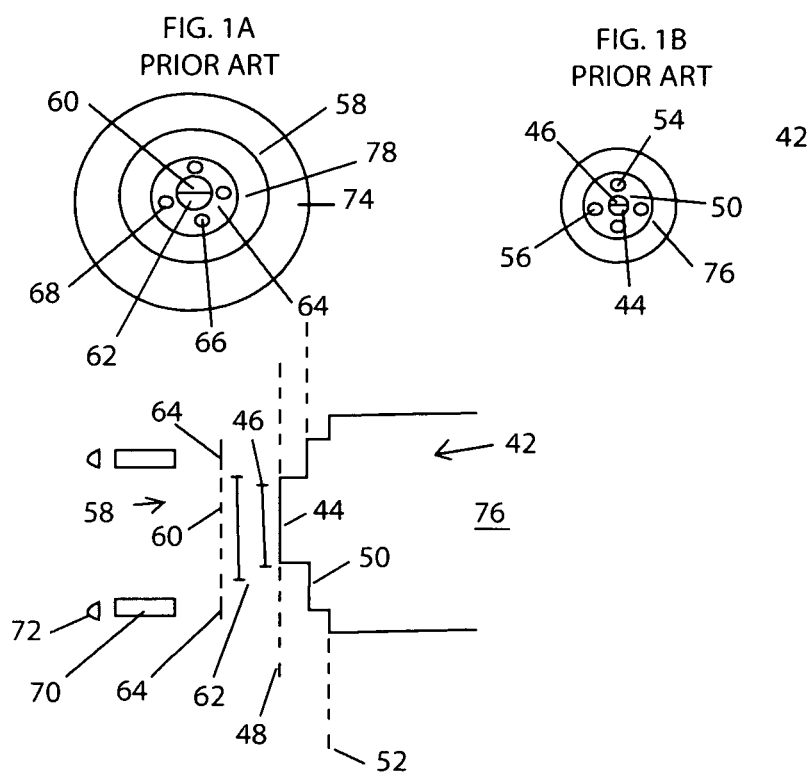
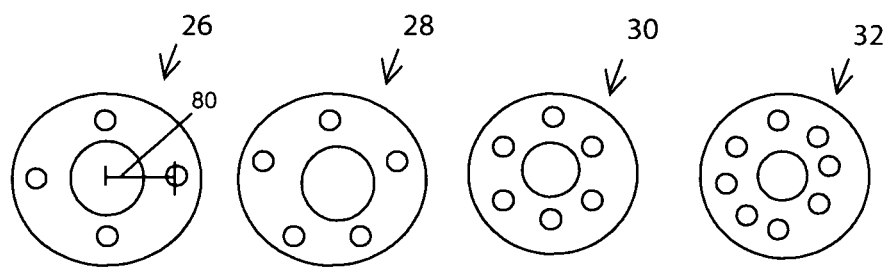
FIG. 2A
PRIOR ART
FIG. 2B
PRIOR ART
FIG. 2C
PRIOR ART
FIG. 2D
PRIOR ART

WHEEL RIM AND HUB ASSEMBLY GASKET AND GASKET KITS

FIELD OF THE INVENTION

The present invention relates generally to wheel assemblies, and specifically, to a gasket to prevent wheel rims for corroding together with hub assemblies.

BACKGROUND

Cars and other automobiles are ubiquitous as forms of transportation. Each includes tires that are mounted onto the chassis with hub assemblies. When a tire needs to be removed, the wheel rim of the tire must be separated from the hub assembly. Unfortunately, if the wheel rim remains attached to the hub assembly for a long time, they may corrode together making it very difficult for them to be separated. This is especially true in any corrosive environment such as colder climates where automobiles will often be driving through roads that have been repeatedly salted for snow and ice removal or coastal communities where automobiles are subjected to salty air. In all circumstances, it is preferred that removal of a tire be a quick and easy operation. In emergency situations, which arise from a flat tire while driving, moreover, such as removal in inhospitable climates or on or near busy highways, being able to quickly remove the tire may save lives. Therefore, there is a need to ensure that the wheel rims of tires do not corrode together with their hub assemblies.

The problem of wheel corrosion is recognized and some devices have been developed to address it. U.S. Pat. No. 8,256,968 to Kapaan, for example, discloses a wheel hub bearing unit including a sacrificial metal gasket surface provided on a mounting flange surface. The gasket surface is formed by coating either side with an electrolytically sacrificial metal, such as zinc or a zinc-aluminum alloy. Although the gasket surface, so treated, will corrode before any of its surrounding features, particularly the flange, it still corrodes. Ultimately, the gasket surface will corrode sufficiently or entirely that it will no longer serve its purpose, after which the entire flange will need to be replaced or the wheel will corrode to the flange.

U.S. Pat. No. 7,824,107 to Takahashi offers a similar solution by disclosing a rust-preventative layer on the wheel-mounting reference surface of the flange. This rust-preventative layer may be provided by a fused ceramics material, a plastics material coated on the reference surface by insert molding of the flange, a separate worked part of a rust-preventative material fixed to the reference surface by an adhesive or the like, or a worked part of a rust-preventative metallic material fixed thereto. Although this rust-preventative layer does address the same problem posed herein, it requires affixation of the layer to the flange. The affixation itself may be clumsy and it is also permanent, which may not necessarily be desirable. This permanence may not allow for use with existing vehicles.

U.S. Pat. No. 5,975,647 to Pons discloses a wheel hub unit including an anti-corrosion layer applied to the cover that avoids the risk of local corrosion at the contact zone between the cover and the hub. Again, this layer acknowledges the known problem, but like Takahashi, this layer is a permanent and may be only applicable to vehicles to be constructed, rather than those already in use.

U.S. Pat. No. 9,321,308 to Baratti discloses a wheel hub bearing unit including a layer of UV photopolymerizable synthetic plastic material with a predetermined thickness applied to the surface of the flange. This layer provides protections from corrosion. This layer also acknowledges the problem, but also provides a solution that would be difficult to execute retroactively.

It is noteworthy that other devices for use between a tire and a hub assembly do exist for other purposes. Wheel spacers, for example, are gaskets for placement between a tire and a hub assembly. Their purpose is to create extra space when needed for custom wheels. While a wheel spacer may well be made of a non-corrosive material, such that the problem discussed above may be addressed, they also, by their very nature, create space between the tire and hub assembly. The creation of such space may be necessary for the use of custom wheels, it is generally not preferred to create such space as it may promote mechanical vulnerabilities and/or performance inefficiencies.

Now referring to FIG. 1A, a front view of prior art wheel rim 58 is provided. Wheel rim 58 includes wheel disc 78, which may include spokes in some tires. Wheel rim 58 is surrounded by tire 74. Although wheel disc 78 and tire 74 are important functional features, they are not relevant to the present invention, and are therefore not discussed herein. Wheel rim 58 includes rim center bore 60, rim inner flange 64, and rim bolt pattern 66. Rim center bore 60 is a hole in the middle of and therefore concentric with wheel rim 58. Rim center bore 60 has rim center bore diameter 62. Rim inner flange 64 surrounds rim center bore 60 and is also concentric with wheel rim 58 and rim center bore 60. Rim inner flange 64 includes a rim bolt pattern 66 including a number of wheel rim holes 68. The wheel rim holes 68 form the rim bolt pattern 66. Standard bolt patterns are discussed herein with reference to FIGS. 2A-2D.

Now referring to FIG. 1B, a front view of prior art hub assembly 42 is provided. Hub assembly 42 mates with wheel rim 58, as described herein, to attach wheel rim 58 to a vehicle. Hub assembly 42 is attached to a vehicle through vehicle attachment 76. One of ordinary skill in the art will recognize that hub assembly 42 may include elements such as a brake drum and brake rotor, and that all such essential elements of a standard hub assembly 42 are included within the overall term, hub assembly 42, as used herein. Although vehicle attachment 76 includes important functional features, they are not relevant to the present invention, and are therefore not discussed herein. Hub assembly 42 includes center lip 44 with a lip diameter 46; wheel mounting flange 50; and hub bolt pattern 54 formed of hub assembly holes 56. When wheel rim 58 and hub assembly 42 are mated so as to attach wheel rim 58 to a vehicle, center lip 44 will extend through rim center bore 60. As such, lip diameter 46 will always be less than rim center bore diameter 62, even if only just less than to provide a snug fit. Wheel mounting flange 50 surrounds and is concentric with center lip 44. As discussed below with reference to FIG. 1C, center lip 44 is raised from wheel mounting flange 50 so that these two features are disposed in parallel planes. Hub bolt pattern 54 with hub assembly holes 56 is similar to rim bolt pattern 66 with wheel rim holes 68.

Hub assembly 42 and wheel rim 58 will be affixed to one another by bolts 70 and lug nuts 72 (shown in FIG. 1C). Bolts 70 must be able to extend through hub bolt pattern 54 and rim bolt pattern 66. As such hub bolt pattern 54 and rim bolt pattern 66 must be alignable with one another. As used herein, the term "alignable with" means that a bolt patterns of two or more components must be able to be positioned such that at least two, and preferably at least four bolts, may extend through the two or more openings that are the bolt patterns to secure the two or more components together with a lug nut. As shown in FIGS. 1A and 1B, hub bolt pattern 54 and rim bolt pattern 66 have four hub assembly holes 56 and four wheel rim holes 68, respectively, and each hole 56, 68 has the same hole distance 80 (as discussed below with respect to FIG. 1C). Hub bolt pattern 54 is therefore alignable with rim bolt pattern 66 so that four bolts 70 may extend through wheel mounting flange 50 and rim inner flange 64 to secure hub assembly 42 and wheel rim 58 together with lug nuts 72.

Now referring to FIG. 1C, a side view of wheel rim 58 and hub assembly 42 is provided. For clarity, only rim inner flange 64 and rim center bore 60, in dashed lines within either side of rim inner flange 64, of wheel rim 58 are indicated. Lip diameter 46 is clearly less than rim center bore diameter 62 so as to allow center lip 44 to extend into rim center bore 60 for mating. Rim bolt pattern 66 and hub bolt pattern 54 are not visible from this view, but it is clear that once center lip 44 has been disposed within rim center bore 60, wheel mounting flange 50 will be flush with rim inner flange 64, so that rim bolt pattern 66 and hub bolt pattern 54 may be aligned. Center lip 44 is shown disposed in center lip plane 48 (indicated by dashed lines), slightly raised from wheel mounting flange plane 52 (also indicated by dashed lines), in which wheel mounting flange 50 is disposed. Center lip plane 48 and wheel mounting flange plane 52 are parallel to one another.

Now referring to FIGS. 2A-2D, various lug hole patterns are provided. Specifically, standard four lug hole pattern 26, standard five lug hole pattern 28, standard six lug hole pattern 30, and standard eight lug hole pattern 32, are shown, respectively. It is understood that hub bolt pattern 54 and rim bolt pattern 66 may be any of these standard patterns 26, 28, 30, 32, so long as hub bolt pattern 54 and rim bolt pattern 66 are alignable with one another. The holes in the lug hole patterns 26, 28, 30, 32 are a hole distance 80 from the center of rim center bore 60 of a wheel rim 58 and/or from the center of center lip 46 of a hub assembly 42. In order for a rim bolt pattern 66 and a hub bolt pattern 54 to be alignable with one another, their respective hole distances 80 must be equal. This is the case, regardless of any disparity in size between the rim center bore diameter 62 and the lip diameter 46. It is understood that other nonstandard patterns, such as with custom tires or wheel rims, may be used.

SUMMARY OF THE INVENTION

The present invention is a gasket and gasket kits including the gasket of the present invention.

The gasket of the present invention is a flat doughnut-shaped disc. It is flat in that it has only a very shallow depth, preferably of no greater than 1/64 of an inch. The gasket of the present invention is used between wheel rims and hub assemblies and, unlike wheel spacers, is not intended to create space therebetween, but merely physical separation. As such the depth of the gasket of the present invention is less than the width of a wheel spacer and this depth is therefore, not merely a design choice, but a functional feature of the present invention. Doughnut-shaped, as used herein, has its common meaning that the gasket is an outer circle with a circle hole cut out of the middle of the outer circle, where the outer circle and circle hole are concentric. Disc, as used herein, also has its common meaning of a thin circular object.

In its most basic form, the gasket of the present invention includes a gasket center bore with a gasket center bore diameter and a gasket flange concentric with and surrounding the gasket center bore, where the gasket flange has at least one opening through it that forms a gasket bolt pattern. The gasket has a core surrounded by a coating, and at least the coating is made of noncorrosive, water-impermeable material. The gasket center bore is a hole within the disc of the gasket that is concentric with the disc. In other words, using language from above, the gasket center bore is to the gasket as the circle hole is to the doughnut. When the gasket is in use, the gasket center bore must fit around the center lip of the hub assembly. As such, the gasket center bore diameter is always greater than the lip diameter of the hub assembly. Although in some embodiments, the gasket center bore diameter is only slightly greater than the lip diameter of the hub assembly, accommodating a snug fit, it is preferred that a larger gasket center bore diameter is standard so as to accommodate a more universal fit.

The gasket flange of the gasket is the remaining portion of the disc after the gasket center bore has been cut out. When the gasket is in use, the gasket flange will be disposed flush between the wheel mounting flange of the hub assembly and the rim inner flange of the wheel rim. The gasket flange includes a gasket bolt pattern, which are openings through the gasket flange that are alignable with the hub bolt pattern of the hub assembly and the rim bolt pattern of the wheel rim between which the gasket is disposed.

The gasket includes a core surrounded by a coating, and at least the coating is made of noncorrosive, water-impermeable material. It is preferred that the core is made of the same noncorrosive, water-impermeable material, so that the gasket is a single solid piece. In some embodiments, however, the core may be made of a different material that may be noncorrosive or corrosive and water-impermeable or water-permeable. It is understood that, especially in the preferred embodiment where the gasket is a single solid piece, the coating and core may be very thin so that the depth of the gasket remains very small.

The purpose of the gasket is to address the problem of hub assemblies and wheel rims corroding together so that they are difficult or impossible to separate without damaging one or both components. The gasket of the present invention separates the hub assembly and the wheel rim just enough so that any corrosion forms separately on the hub assembly and the wheel rim, without bonding the two together. A key feature of the gasket of the present invention, therefore, is that it be made of noncorrosive material. The noncorrosive material is preferably non-compressible, water-impermeable, grease resistant and heat tolerant. The preferred noncorrosive material is parchment paper, but one of ordinary skill in the art will recognize that many materials may be used for this purpose. Parchment paper is made by running sheets of paper pulp through a bath of sulfuric acid or zinc chloride. This process partially dissolves or gelatinizes the paper. This treatment forms a sulfurized cross-linked material with a high density, stability, and heat resistance, as well as low surface energy. Unlike the prior art Takahashi, Pons, and Baratti references discussed above, the noncorrosive material is not applied to the hub assembly or to the wheel rim directly. Instead, the gasket may be used at any time during the life of the hub assembly and wheel rim. Takahashi, Pons, and Baratti would require application of their layers or coating during manufacture or retroactively, either of which may be expensive, labor intensive, or impossible. The gasket of the present invention, on the other hand, is inexpensive to manufacture and may be easily put in use at any time. Moreover, using parchment paper as the material out of which the gasket is made is a novel and unexpected aspect of the present invention. In the auto world of metal machinery, it is not obvious to use a material that would appear at first glance to be flimsy compared to its metal counterparts. The present invention has shown parchment paper to be durable enough for use with such metal counterparts, however. In addition, parchment paper has several other attributes, such as thinness, high density, stability, heat resistance, water-impermeability, grease resistance, non-compressibility, and of course, non-corrodibility, that make it distinctly well suited for this purpose.

The gasket flange includes a gasket bolt pattern, which is a series of openings through the gasket flange that allow the gasket to be alignable with a wheel rim and a hub assembly. Although the coating of the gasket is water-impermeable, it is understood that water can permeate the gasket through the openings of the gasket bolt pattern. The gasket bolt pattern may be any of the standard four, five, six, or eight lug hole patterns described above. In any of these embodiments, the openings in the gasket bolt pattern are round holes with a uniform opening distance, as measured from the center of the gasket center bore to the openings, similar to the hole distances described above. As used herein "opening distance" means the distance measured between the center of the gasket center bore to an opening. The gasket bolt pattern may not be any of these standard lug hole patterns, however, especially for use with specialty wheel rims.

In addition, the gasket bolt pattern may take a form so as to be alignable with several different hub bolt patterns and rim bolt patterns. Such a gasket bolt pattern may be comprised of at least two smile slots or tilted rectangles. As used herein, "smile slots" are elongated, curved openings with a consistent opening distance along the entire length of the opening. Their curvature makes the openings resemble a smile, hence the nomenclature. Their elongate nature may allow for more than one or several bolts to extend through a single smile slot and for alignment with different hub bolt patterns and rim bolt patterns without precisely mirroring those bolt patterns.

As used herein, "tilted rectangles" are a series of rectangular openings through the gasket flange. The openings are rectangular and have first and second ends. The opening distance from the center of the gasket center bore to the first end of the tilted rectangle is a first end opening distance. The opening distance from the center of the gasket center bore to the second end of the tilted rectangle is a second end opening distance. The first end opening distance is greater than the second end opening distance. As such the first end is closer to the outer perimeter of the gasket and the second end is closer to the inner perimeter surrounding the gasket center bore. The openings therefore literally look like tilted rectangles. This gasket hole pattern allows for the gasket to be alignable with hub bolt patterns and rim bolt patterns with hub assembly holes and wheel rim holes disposed at a range of hole distances, the range being the first end opening distance to the second end opening distance.

In its most basic form, the first gasket kit of the present invention includes a gasket of the present invention, as described above, and a hub assembly, where the gasket bolt pattern of the gasket is alignable with the hub bolt pattern of the hub assembly. In some embodiments, the first gasket kit also includes a wheel rim that includes a rim bolt pattern alignable with both the gasket bolt pattern and the hub bolt pattern. In some embodiments, the first gasket kit also includes at least two, and preferably at least four, bolts sized and dimensioned to secure the gasket flange and the wheel mounting plate together.

In its most basic form, the second gasket kit of the present invention includes a gasket of the present invention, as described above, and a wheel rim, where the gasket bolt pattern of the gasket is alignable with the rim bolt pattern of the wheel rim. In some embodiments, the second gasket kit also includes at least two, and preferably at least four, bolts sized and dimensioned to secure the gasket flange and the rim inner flange together.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 1A is a front view of a prior art wheel rim.
FIG. 1B is a front view of a prior art hub assembly.
FIG. 1C is a side view of a prior art wheel rim and hub assembly.
FIG. 2A is a diagram of a standard four lug hole pattern.
FIG. 2B is a diagram of a standard five lug hole pattern.
FIG. 2C is a diagram of a standard six lug hole pattern.
FIG. 2D is a diagram of a standard eight lug hole pattern.

DETAILED DESCRIPTION

Figure 3A:
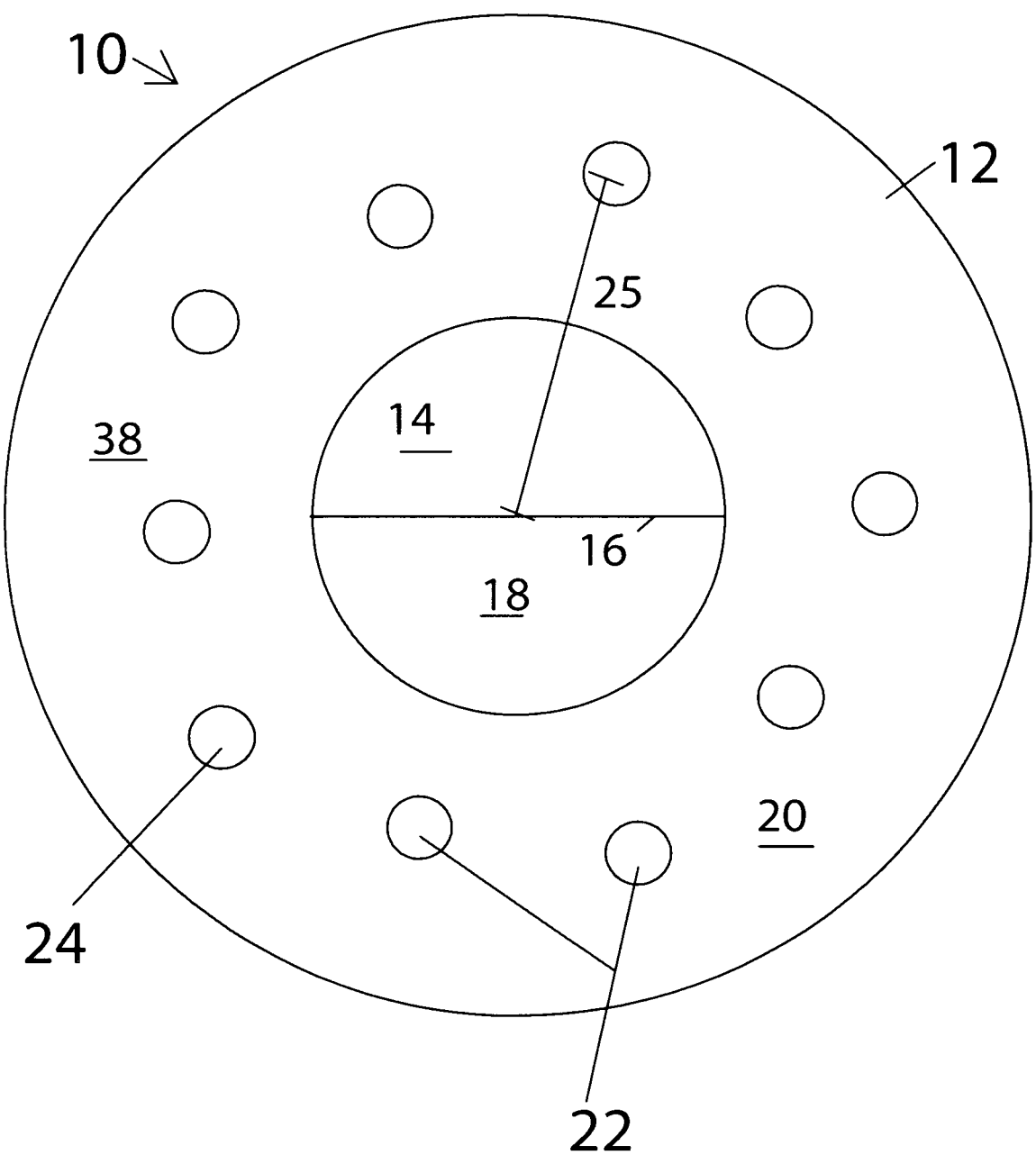
FIG. 3A is front view of a gasket of the present invention with a gasket bolt pattern of multiple five gasket pattern holes.

Now referring to FIG. 3A, a gasket 10 of the present invention is provided. Gasket 10 is doughnut-shaped disc 12 with gasket center bore 14 and gasket flange 20 with gasket bolt pattern 22. Gasket center bore 14 is a hole 18 in the middle of disc 12 and concentric with disc 12, and has gasket center bore diameter 16. As shown, gasket bolt pattern 22 includes ten openings 24, which are holes in this embodiment, each of which has the same opening distance 25, which is a radius as measured from the center of gasket center bore 14 to the opening 24. The gasket bolt pattern 22 shown with ten openings 24 is nonstandard and would likely be used with custom wheel rims. It is understood, however, that gasket flange 20 may include similar standard gasket bolt patterns 22, such as standard four, five, six, and eight hole lug patterns 26, 28, 30, 32, that would also include holes as openings 24, each of which has an equal opening distance 25.

Gasket 10 is made of noncorrosive, water-impermeable material 38. Material 38 may be parchment paper, for example. Material 38 may be rigid and non-flexible or it may have some malleability. So long as the pressure that material 38 will undergo when secured tightly between a hub assembly 42 and a wheel rim 58 does not threaten its integrity and material 38 will not adhere to either hub assembly 42 or wheel rim 58 in such a situation, material 38 may have some malleability so that it slightly conforms to one or both of hub assembly 42 or wheel rim 58 or deforms under such pressure and reforms once the pressure is removed.

Figure 3B:
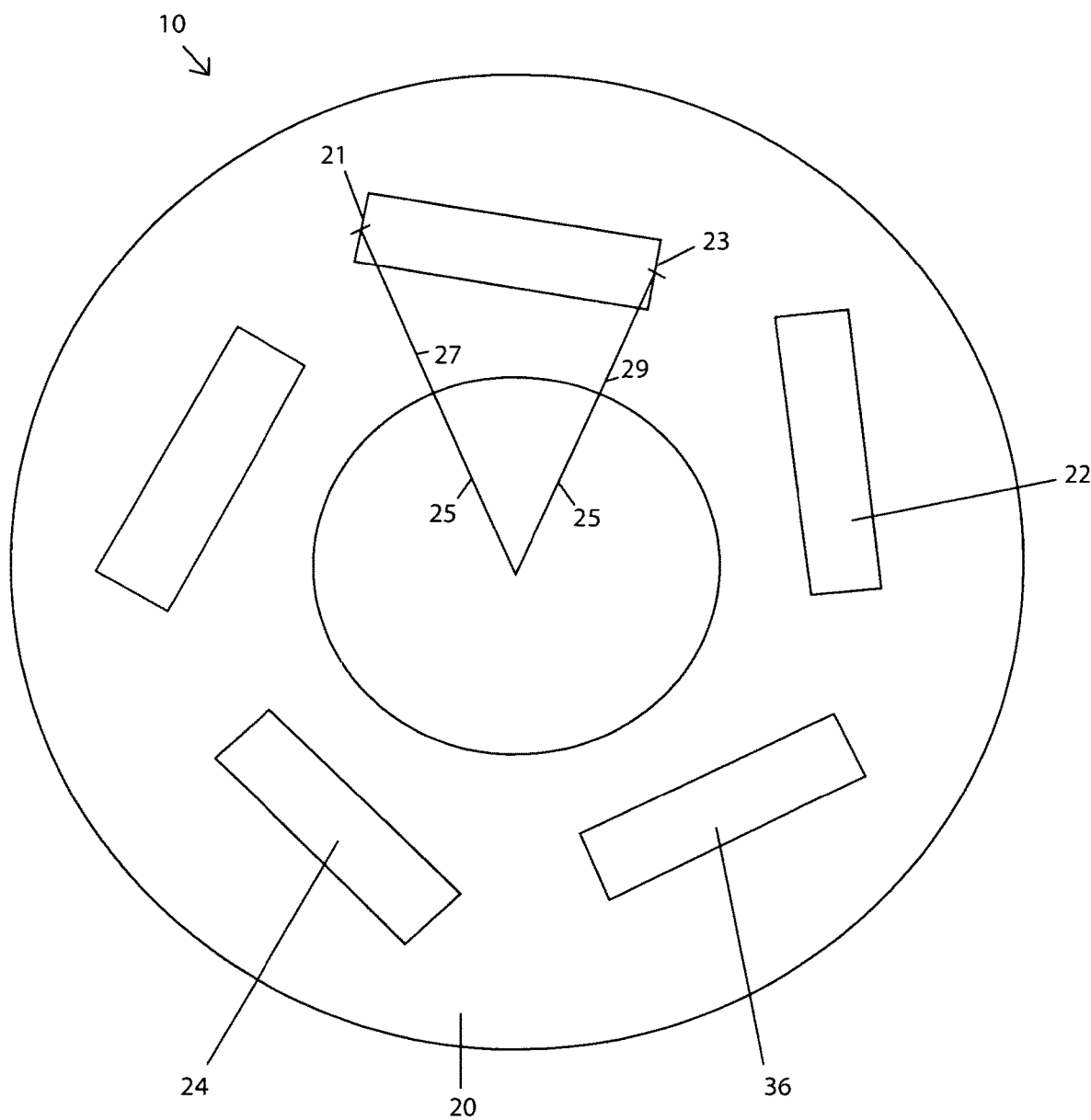
FIG. 3B is a front view of an alternative gasket of the present invention with a gasket bolt pattern of five tilted rectangles.

Now referring to FIG. 3B, gasket 10 with gasket flange 20 with gasket bolt pattern 22 of tilted rectangles 36 is provided. Each opening 24 of gasket bolt pattern 22 is a rectangle with a first end 21 and a second end 23. The opening distance 25 to first end 21 is first end opening distance 27. The opening distance 25 to second end 23 is second end opening distance 29. First end opening distance 27 is greater than second end opening distance 29. This allows for gasket 10 to be alignable with hub bolt patterns 54 and rim bolt patterns 66 with hole distances 80 within a range of first end opening distance 27 and second end opening distance 29. The embodiment of gasket 10 that is shown includes five openings 24, but it is understood that fewer than or greater than five tilted rectangles 36 may be included.

Figure 3C:
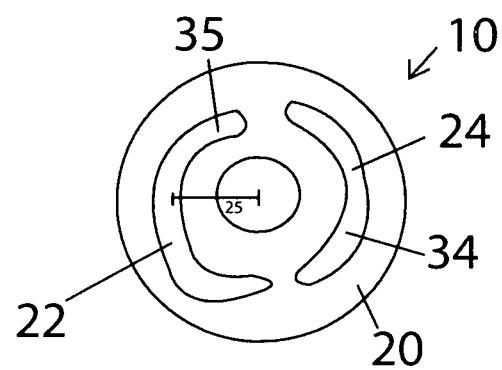
FIG. 3C is a front view of an alternative gasket of the present invention with a gasket bolt pattern of two smile slots.

Now referring to FIG. 3C, gasket 10 with gasket flange 20 with gasket bolt pattern 22 of smile slots 34 is provided. Each opening 24 of gasket bolt pattern 22 is an elongated slot with a uniform opening distance 25 along the entire length of the slot. The embodiment of gasket 10 that is shown includes two large smile slots 34, but it is understood that a greater number of smile slots 34 may be included or even just one very large smile slot 34. It is understood, however, that depending on the durability of material 38, a small number of large smile slots 34 may be more prone to damage. This is counterbalanced with the fact that a small number of large smile slots 34 will accommodate basically any standard lug hole pattern 26, 28, 30, 32 or even custom hub bolt patterns 54 and rim bolt patterns 66, such as that shown in FIG. 3A, so long as each opening in the pattern has a hole distance 80 equal to opening distance 25. A single large smile slot 34 is the only gasket bolt pattern 22 that would require only one opening 24. This is because one large smile slot 34 could still accommodate at least two bolts 70, and potentially many greater than two bolts 70.

Figure 4:
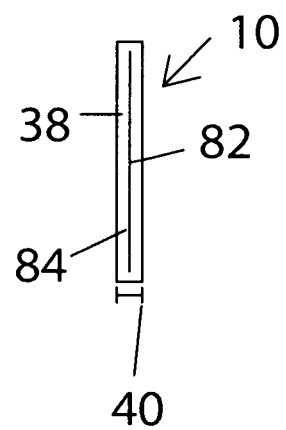
FIG. 4 is a side cutaway view of a gasket of the present invention.

Now referring to FIG. 4, a side cutaway view of a gasket 10 of the present invention is provided. Gasket 10 has depth 40 and includes core 82 and coating 84. It is preferred that depth 40 be no greater than 1/64 of an inch. Depth 40 may depend somewhat on material 38. Some materials 38, for example, may be more durable if slightly thicker. It is also preferred that core 82 and coating 84 are made of the same material 38 so that gasket 10 is a single piece. In such preferred embodiments, there is no significant distinction between core 82 and coating 84. Only coating 84 is required to be made from material 38, however. In some embodiments, for example, core 82 may be made from a different material than coating 84 made from material 38. Such embodiments may be used, for example, if durability will be enhanced by using a different material for core 82 or if manufacturing coasts would be reduced by using a different material for core 82.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

We claim:

1. A gasket for use between a wheel rim comprising at least a rim center bore with a rim center bore diameter; a rim inner flange surrounding the rim center bore; and a rim bolt pattern disposed through the rim inner flange, and a hub assembly comprising at least a center lip with a lip diameter less than the rim center bore diameter; a wheel mounting flange surrounding the center lip; a hub bolt pattern disposed through the wheel mounting flange, wherein the hub bolt pattern is alignable with the rim bolt pattern when the rim inner flange and wheel mounting flange are positioned flush against one another, said gasket comprising a flat doughnut-shaped disc comprising:

a gasket center bore that is a hole in said disc that is concentric with said disc and comprises a gasket center bore diameter greater than the lip diameter of the hub assembly; and a gasket flange concentric with and surrounding said gasket center bore and comprising a gasket bolt pattern comprising at least one opening through said gasket flange, wherein said gasket bolt pattern is alignable with the rim bolt pattern of the wheel rim and the hub bolt pattern of the hub assembly;

wherein said gasket comprises a core surrounded by a coating and at least said coating is made of a noncorrosive, water-impermeable material; and wherein said core is also made of said noncorrosive, water-impermeable material.

2. The gasket as claimed in claim 1, wherein said noncorrosive, water-impermeable material is parchment paper.

3. The gasket as claimed in claim 1, further comprising a depth of no greater than 1/64 of an inch.

4. The gasket as claimed in claim 1, wherein said gasket bolt pattern is one of a group consisting of a standard four lug hole pattern, a standard five lug hole pattern, a standard six lug hole pattern, and a standard eight lug hole pattern.

5. The gasket as claimed in claim 1, wherein said gasket bolt pattern comprises at least one smile slot, wherein said at least one smile slot is an elongated slot disposed through said gasket flange and around said gasket center bore that has a uniform opening distance.

6. The gasket as claimed in claim 1, wherein said gasket bolt pattern comprises at least two tilted rectangles, wherein:
each of said tilted rectangles comprises a first end and a second end;
said first end comprises a first end opening distance;
said second end comprises a second end opening distance; and
said first end opening distance is greater than said second end opening distance.

7. The gasket as claimed in claim 1, wherein said noncorrosive, water-impermeable material is also non-compressible, grease resistant, and heat tolerant.

8. A gasket for use between a wheel rim comprising at least a rim center bore with a rim center bore diameter; a rim inner flange surrounding the rim center bore; and a rim bolt pattern disposed through the rim inner flange, and a hub assembly comprising at least a center lip with a lip diameter less than the rim center bore diameter; a wheel mounting flange surrounding the center lip; a hub bolt pattern disposed through the wheel mounting flange, wherein the hub bolt pattern is alignable with the rim bolt pattern when the rim inner flange and wheel mounting flange are positioned flush against one another, said gasket comprising a flat doughnut-shaped disc comprising:

a gasket center bore that is a hole in said disc that is concentric with said disc and comprises a gasket center bore diameter greater than the lip diameter of the hub assembly; and a gasket flange concentric with and surrounding said gasket center bore and comprising a gasket bolt pattern comprising at least one opening through said gasket flange, wherein said gasket bolt pattern is alignable with the rim bolt pattern of the wheel rim and the hub bolt pattern of the hub assembly;

wherein said gasket is made of parchment paper.

9. The gasket as claimed in claim 8, further comprising a depth of no greater than 1/64 of an inch.

10. The gasket as claimed in claim 8, wherein said gasket bolt pattern is one of a group consisting of a standard four lug hole pattern, a standard five lug hole pattern, a standard six lug hole pattern, and a standard eight lug hole pattern.

11. The gasket as claimed in claim 8, wherein said gasket bolt pattern comprises at least one smile slot, wherein said at least one smile slot is an elongated slot disposed through said gasket flange and around said gasket center bore that has a uniform opening distance.

12. The gasket as claimed in claim 8, wherein said gasket bolt pattern comprises at least two tilted rectangles, wherein:
- each of said tilted rectangles comprises a first end and a second end;
- said first end comprises a first end opening distance;
- said second end comprises a second end opening distance; and
- said first end opening distance is greater than said second end opening distance.

* * * * *